United States Patent
Le et al.

(10) Patent No.: US 12,333,779 B2
(45) Date of Patent: Jun. 17, 2025

(54) METHOD OF SALIENT OBJECT DETECTION IN IMAGES

(71) Applicant: VIETTEL GROUP, Ha Noi (VN)

(72) Inventors: Van Bang Le, Ha Noi (VN); Manh Hung Lu, Hai Phong (VN)

(73) Assignee: VIETTEL GROUP, Ha Noi (VN)

( * ) Notice: Subject to any disclaimer, the term of this patent is extended or adjusted under 35 U.S.C. 154(b) by 399 days.

(21) Appl. No.: 18/071,691

(22) Filed: Nov. 30, 2022

(65) Prior Publication Data

US 2023/0177801 A1 Jun. 8, 2023

(30) Foreign Application Priority Data

Nov. 30, 2021 (VN) .............................. 1-2021-07680

(51) Int. Cl.
*G06V 10/46* (2022.01)
*G06T 5/70* (2024.01)
*G06V 10/72* (2022.01)

(52) U.S. Cl.
CPC .............. *G06V 10/462* (2022.01); *G06T 5/70* (2024.01); *G06V 10/72* (2022.01)

(58) Field of Classification Search
CPC ...... G06V 10/462; G06V 10/72; G06V 20/68; G06T 5/70; G06T 2207/30108; G06T 2207/30232; G06T 7/11
USPC ....................................................... 382/181
See application file for complete search history.

(56) References Cited

U.S. PATENT DOCUMENTS

| | | | |
|---|---|---|---|
| 10,970,566 B2* | 4/2021 | Gu | G06F 18/23 |
| 2015/0227810 A1* | 8/2015 | Perazzi | G06T 7/11 |
| | | | 382/107 |
| 2018/0204088 A1* | 7/2018 | Chen | G06V 10/776 |

OTHER PUBLICATIONS

Spatial Variance of Color and Boundary Statistics for Salient Object Detection (Year: 2013).*
Superpixel-based spatial-spectral dimension reduction for hyperspectral imagery classification (Year: 2019).*
Superpixel Segmentation Based on Spatially Constrained Subspace Clustering (Year: 2020).*

* cited by examiner

*Primary Examiner* — Tom Y Lu
*Assistant Examiner* — Pardis Sohraby
(74) *Attorney, Agent, or Firm* — patenttm.us

(57) ABSTRACT

A method for determining a salient object in an image based on superpixel analysis consists of initializing superpixels using SLIC algorithm and merging of adjacent superpixels that have similar color distribution. Then, calculate the spatial and color distribution correlation between the superpixels after being merged. Combined with the statistics of the occupancy rate, the distance to the original image center, and the global contrast of the superpixels, calculate the saliency evaluation vector for each superpixel. Finally, interpolate the saliency for each pixel in the superpixel.

1 Claim, 3 Drawing Sheets

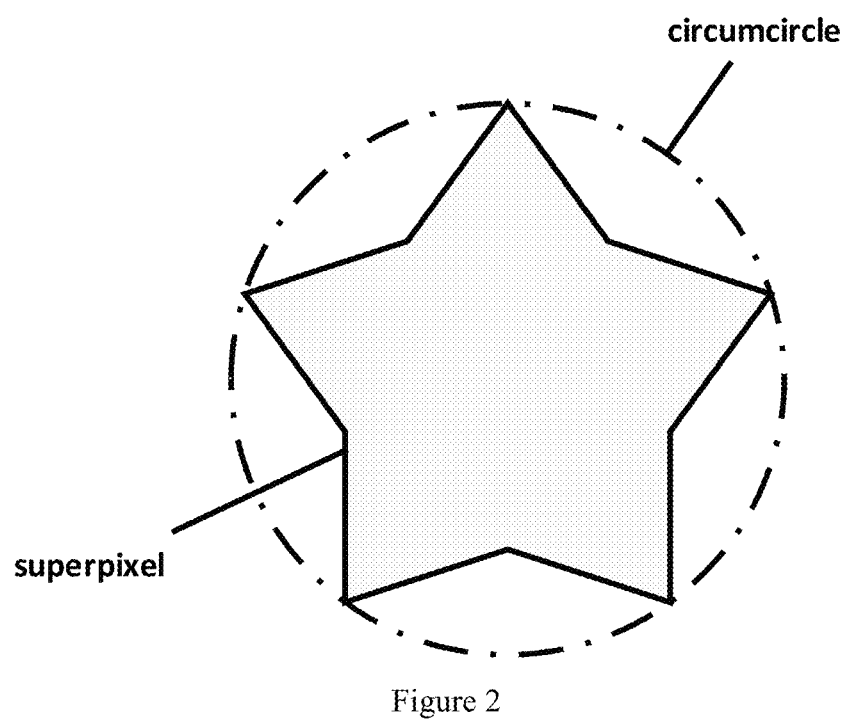
Figure 2
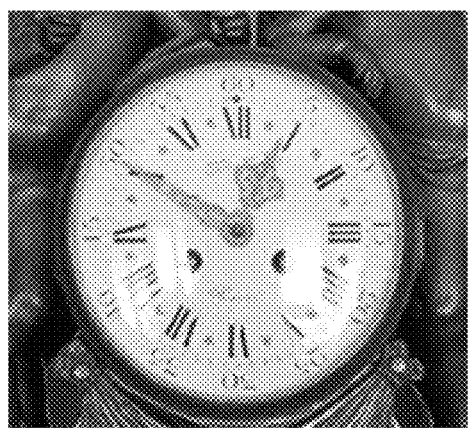
Figure 3a
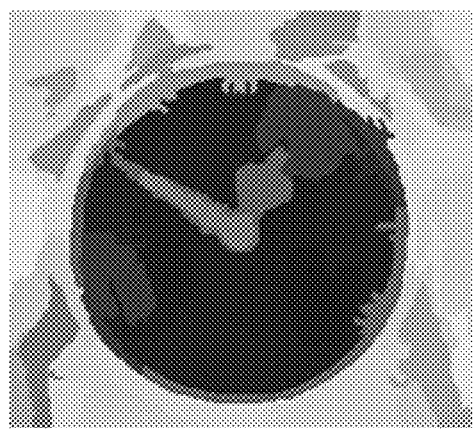
Figure 3b
Figure 3

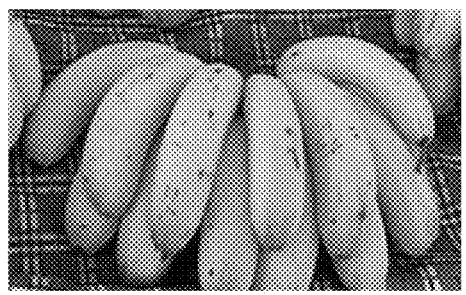 
Figure 4a  Figure 4b
Figure 4

METHOD OF SALIENT OBJECT DETECTION IN IMAGES

FIELD OF THE TECHNOLOGY

This invention presents a method for detecting a salient object in an image. Specifically, the method of identifying salient objects in images is applied in the fields of artificial intelligence and computer vision, helping to process and analyze objects with a more prominent color distribution.

BACKGROUND

In computer vision systems in general and object segmentation systems in particular, salient object detection in an image plays an important role in determining which components to focus on in images, for example, segmenting objects from the background, detecting and marking prominent features, or identifying abnormal behaviors in a video sequence.

In the field of salient object detection, superpixel is one of the popular techniques for analyzing and grouping close pixels that have similar color distributions. However, this technique usually only has a global analysis role for the image, it is not possible to identify the superpixels that are more salient than the surrounding background.

Recently, deep learning models are applied to the salient object detection problem. However, with this approach, a large training dataset needs to be prepared. In addition, the analysis efficiency for objects that have not appeared in the training data is very poor. On the other hand, superpixel analysis-based methods have high adaptability to detect unseen salient objects and events, which can be flexibly used in many different applications.

SUMMARY

A primary contribution of this invention is to propose a segmentation method for salient objects in an image. Consequently, it alleviates mentioned above existing technical issues. The proposed segmentation algorithm is based on color distribution analysis and spatial correlations in images.

In this invention, the salient object segmentation method contains several components. The first module is superpixel initialization from the input image and clustering neighboring superpixels with a similar color distribution. The second module is color and spatial correlation analysis between superpixels. The final module is to select and merge superpixels to segment salient objects.

BRIEF DESCRIPTION

Step 1: Pre-processing input image; in this step, a blurring Gaussian algorithm is applied, then transform from RGB (Red-green-blue) color space to HSV (Hue-Saturation-Illumination) color space, and apply SLIC (Simple Linear Iterative Clustering) is to initialize superpixels and statistical analysis on color and spatial distribution of the superpixels.

Step 2: Merge superpixels with similar color correlation.

Step 3: Statistical analysis on the color and spatial characteristics of the superpixels; in this step, based on the superpixels merged after step 2, perform descriptive statistics about the scale of the superpixel, the distance to the original image center and calculate the correlation of the color distribution, spatial distribution, and the contrast of superpixels.

Step 4: Analyze the final estimation of the discriminant between superpixels; in this step, based on the calculation of the composite correlation matrix, and the salient evaluation vector of the superpixel, finally interpolate the saliency index of each pixel in the corresponding superpixel.

Where steps 1 and 2 both run on module Superpixel initialization, and the others (steps 3, 4) run on module Correlation analysis and module Saliency object segmentation, respectively.

BRIEF DESCRIPTIONS OF THE DRAWINGS

FIG. 2 shows the method of calculating the occupancy index of superpixels;

FIGS. 3a and 3b show the result of the method for a test image of a banana;

FIGS. 4a and 4b show the result of the method for a test image of a clock;

DETAILED DESCRIPTION

Figure 1:
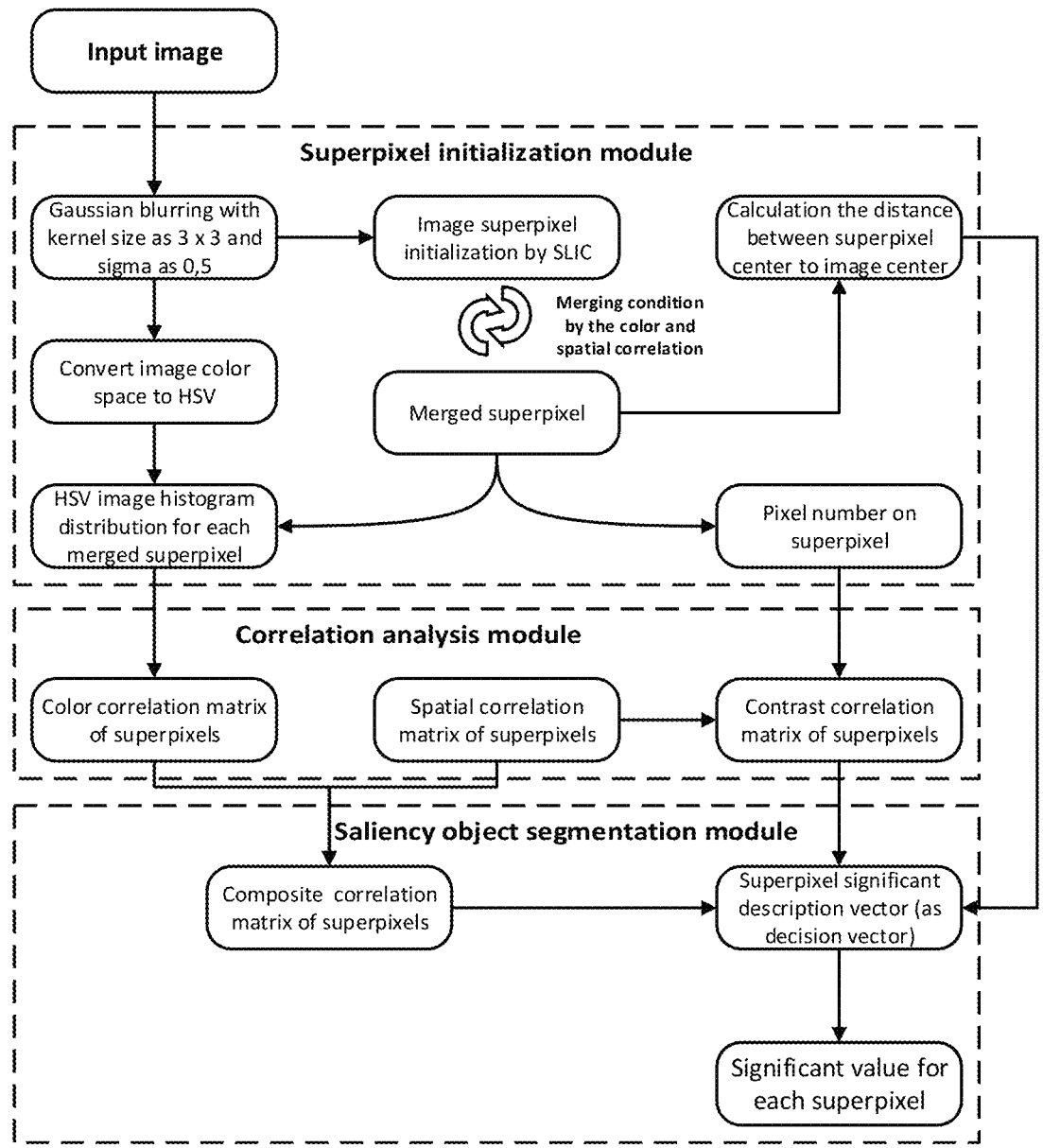
FIG. 1 shows the steps of the inventive method of superpixel analysis based salient object segmentation in images.

Step 1: Pre-processing input image.

In this step, a blurring Gaussian algorithm is applied, then transform from RGB (Red-green-blue) color space to HSV (Hue-Saturation-Illumination) color space, and apply SLIC (Simple Linear Iterative Clustering) to initialize superpixels and statistical analysis on color and spatial distribution of the superpixels. The detail of the sub-steps is following:

Step 1.1: Image I(x, y) is an RGB image convoluted with a Gaussian kernel k with the size of [3,3], and a sigma value of 0.5, as the below formula:

$$I(x,y) \leftarrow I(x,y) \otimes k(i,j)$$

Step 1.2: Superpixel initialization from the blurred image I(x,y), uses SLIC algorithm, with the parameter n as the maximum number of superpixels. After initialization, the original image is split into large superpixels S(i), where regions with similar characteristics are merged into the same superpixel, and the location of superpixels is marked from small to large with directions from left to right, from up to down.

Step 1.3: Transform the original image from RGB space to HSV space, and obtain I'(x,y).

Step 2: Merge superpixels with similar color correlations. The detail of the sub-steps is following:

Step 2.1: With input as the set of superpixels S(i) was computed at step 1, generate the HSV color distribution for each superpixel. Detail calculation as the below equation:

$$h(i) = \underset{i \in [1,m]}{\text{histogram}}(I'_{S(i)}(x, y), \text{bins} = [8, 8, 8])$$

where, bins is the number of groups divided from 256 gray levels, after calculating the color distribution for each superpixel, a matrix h(i) with size of m×8×8×8 (m is superpixel numbers).

From the h(i) matrix, calculate the color correlation matrix between the superpixels, using the Bhattacharyya Coefficient (BC). The calculation formula is as follows:

$$\underset{i,j \in [1,m]}{\text{color}(i, j)} = BC(h_i, h_j)$$

with BC is the Bhattacharyya Coefficient of two vectors:

$$BC(p,q)=-\ln(10^{-1}+\Sigma\sqrt{p_i q_i})$$

In the above formula, $10^{-1}$ is added to avoid the case that the value from the function $\ln(\cdot)$ does not exist.

Step 2.2: Proceed to merge neighboring superpixels with a similar color distribution. For this process, the superpixels with adjacent positions are superpixels that are directly linked to each other on the image, consequently, on the color correlation matrix, position (i, i+1) with BC lower than the predefined threshold, epsilon, then the two superpixels i and i+1 can be merged into a new superpixel.

After merging superpixels, the superpixels are updated, into new superpixels, as follows:

$$S_{updated}(i) \leftarrow S(i) \atop i \in [1,n']  \quad i \in [1,n]$$

Step 2.3: Continue to perform two steps 2.1 and 2.2, until the number of superpixels remains constant, then terminate the superpixel merging process, and obtain the final superpixel $\{S(i)|i=1,2,\ldots,n\}$.

Step 3: Statistics on the color and spatial characteristics of the superpixels; based on the superpixels $\{S(i)|i=1, 2, \ldots, n\}$ that are merged after step 2, conduct descriptive statistics about the scale of the superpixel, the distance to the center of the image. initialization and calculate the correlation of color distribution, spatial distribution, and the contrast of superpixels. Specifically, it is done through the following small steps:

Step 3.1: Statistics of the distance from the center of the superpixel to the center of the image and count the number of pixels in the superpixel. Normally, the image that needs to calculate the salient area usually focuses on the center area, therefore the superpixels that are close to the center of the image will likely be the salient area.

The distance from the superpixel to the center point of the image is defined by the Euclidean distance from the center of the superpixel to the center point of the original image. The calculation formula is as follows:

$$d(i) = \left\| \frac{\sum_{S(i)}(x, y)}{\sum_{S(i)}|(x, y)|}, (cx, cy) \right\|$$

Where (cx, cy) is the center point of the original image, which is half the height and width of the image, respectively, and is the total number of pixels in the superpixel S(i).

Step 3.2: Calculate the color correlation matrix color(i,j), detailed descriptions of the calculation are the same as in step 2.1.

Step 3.3: From the set of superpixels S(i), calculate the circumscribed circle filling index of each superpixel, the process is shown in FIG. 2. In detail, it is done through the following sub-steps:

Step 3.3.1: Lets call the center point of the i-th superpixel as ci, then the radius of the circumcircle of this superpixel is calculated as follows:

$$r(i) = \max_{(x,y) \in S(i)} (\|(x, y), c_i\|)$$

Step 3.3.2: The circumcircle filling index compact(i) of the superpixel is calculated by following equation:

$$\text{compact}(i) = \frac{\sum_{(x,y) \in S(i)} |(x, y)|}{\pi \times r^2(i)}$$

Step 3.4: From set of superpixels S(i) computed at step 2.3 and the circumcircle filling index compact(i) computed at step 3.3.2, calculate spatial correlation matrix between superpixels, as following formula:

$$\text{spatial}(i, j) = \left(1 - \frac{\|ci, cj\|}{\sqrt{cx^2 + cy^2}}\right) \times (1 - \text{compact}(i))$$

where ci, cj are center points of superpixels i, and j, respectively.

Step 3.5: Compute global contrast matrix between superpixels, where, superpixels with higher number of pixels have more effects on processing of evaluating saliency of the superpixels.

$$\text{contrast}(i, j) = \det_{i,j \in [1,n]} \left( |\text{color}(i, j)|, \left\{ npixel_i = \sum_{S(i)} |(x, y)| \right\} \right)$$

Where $npixel_i$ is the number of pixels in superpixel i. Also contrast(i,j) is normalized to [0,1] based on the interval [min(contrast), max(contrast)]. Also, dot(·) describes the multiplication of two matrices.

Step 4: analyze the final estimation of the discriminant between superpixels; This step calculates the composite correlation matrix, and the saliency evaluation vector of the superpixel, and interpolates the saliency index of each pixel in the corresponding superpixel. This step is done in small steps as follows:

Step 4.1: synthesize the composite correlation matrix, similar(i,j), is a combination of factors: color correlation matrix, spatial correlation matrix, as follows:

similar(i,j)=color(i,j)×spatial(i,j)

The composite correlation matrix is considered a correlation matrix with the estimations being the color correlation matrix under the effect of the spatial correlation matrix as a coefficient matrix. Larger superpixels (a large number of pixels) will have more effect.

Step 4.2: the saliency evaluation vector of the superpixel, decision(i) is calculated from the pixel correlation matrix from step 4.1, the global contrast matrix from step 3.5, and the statistical results of the distance from the center of the superpixel to the center point of the original image from step 3.1. Detail calculations at sub-steps are as following:

Step 4.2.1: calculate the extended spatial matrix spread (i,j), using the composite correlation matrix similar(i,j) and distance d(i). The calculation formula is as follows:

$$\text{spread}(i, j) = \frac{\det(d(i), \text{similar}(i, j))}{\sum_{axis=0} \text{similar}(i, j)}$$

Then matrix spread(i,j) is normalized to [0, 1] based on interval [min(spread), max(spread)].

This step mainly compensates the convergence factor into the initial center point of superpixels. The closer superpixel is to the center the more it gets attention, and it is highly potential is a part of salient objects.

Step 4.2.2: The saliency evaluation vector, decision(i) is a sequence of evaluation indices, it is calculated as follows:

$$\text{decision}(i) = 1 - \frac{\text{dot}(\text{contrast}(i,j), \text{similar}(i,j)) \times \text{dot}(\text{spread}(i,j), \text{similar}(i,j))}{\sum_{axis=0} \text{similar}(i,j)^2}$$

The decision(i) vector has a length that is equal to number of initialized superpixels, the larger values are the more salient they are.

Step 4.3: Calculate saliency index of each pixel p(x,y) in HSV space via salient evaluation vector.

$$S(p) = \frac{\sum_{S(i) \in N(p)} \text{decision}(i) \times \text{histogram}(i)[\text{bin}(p)]}{\sum_{S(i) \in N(p)} \text{histogram}(i)[\text{bin}(p)]}$$

Where N(p) is neighboring pixels of p(x,y) (eight points).

In the above equation, pixels with more popular color intensity in superpixel, the saliency index of those pixels are higher. Where bin(p) is color intensity (h,s,v) in HSV space of the pixel p(x,y) after it is compressed into 3-bit, as follows:

$$\text{bin}(p) = \left[\text{round}\left(\frac{h}{8}\right), \text{round}\left(\frac{s}{8}\right), \text{round}\left(\frac{v}{8}\right)\right]$$

Finally, the original RGB image is transformed into a matrix with the same size, the value of an element in the matrix represents the saliency of each corresponding pixel.

EXAMPLES OF INVENTION IMPLEMENTATION

The research team has carried on experiments and evaluated the performance of the proposed method in this invention with various types of data.

As shown in FIGS. 3 and 4, the result of the salient object detection with the objects of bananas, a clock, and a person, respectively. FIGS. 3a and 4a are the original images, respectively, and FIGS. 3b and 4b are the results of the salient object detection (the darker the color is, the more salient it is).

The results show the ability to detect salient objects at multi-levels of the proposed method, for example in FIG. 3, the watch stands out more from the background, while in the watch the hands stand out more than the rest, which shows that good self-adaptability of the method.

The proposed salient object detection method in this patent is suitable for multi-types of objects, is able to be used for many applications, and can be the fundamental step for abnormal analysis problems in industrial products, behavior analysis problems in video sequences, as well as problems that need to remove salient objects from the background, helping for automatic data processing.

BENEFITS (EFFECTIVENESS) THAT CAN BE ACHIEVED BY THE INVENTION

The method presented in the invention has been deployed in various products for analyzing visual characteristics of humans and vehicles, security monitoring systems, and searching for objects of the Viettel High-tech and Industrial Corporation. Objects such as humans, and vehicles are segmented from the background of the image, analyzing color characteristics, in addition to salient elements of appearance, wear, accessories, logo, etc. They are the features to search for humans and vehicles in the video surveillance system.

In addition, this method is also used effectively in processing tools, data analysis, and data normalization for video data from cameras. A large amount of data will be automatically analyzed and segmented based on wear characteristics, and the method can perform the segmentation of multi-types of objects from the background in images.

Besides, in terms of practical implementation, the proposed method in this invention does not require high computation resources, therefore the technology has high applicability in industrial products.

The invention claimed is:
1. A computer implemented method of Salient Object detection in an image, comprising:
   Step 1: Pre-processing an input image, in this step, a blurring Gaussian algorithm is applied to the image, then the image is transformed from RGB (Red-green-blue) color space to HSV (Hue-Saturation-Illumination) color space, and SLIC (Simple Linear Iterative Clustering) is applied to initialize superpixels and statistical analysis on color and spatial distribution of the superpixels with the following sub-steps:
   An Image I(x, y) is RGB image convoluted with a Gaussian kernel k with a size of [3,3], and a sigma value of 0.5, according to the below formula:

$I(x,y) \leftarrow I(x,y) \otimes k(i,j)$

Providing a blurred image, Superpixel initialization from the blurred image I(x,y), uses a SLIC algorithm, with a parameter n as the maximum number of superpixels, after initialization, the original image is split into large superpixels S(i), where regions with similar characteristics are merged into a same superpixel, and location of superpixels is marked from small to large with directions from left to right, from up to down;
   the original image is transformed from RGB space to HSV space, obtaining I'(x, y);
   Step 2: Merge superpixels with similar color correlations according to the following:
   With input as the set of superpixels S(i) computed at step 1, generate an HSV color distribution for each superpixel according to the below equation:

$$h(i) = \underset{i \in [1,m]}{\text{histogram}}(I'_{s(i)}(x,y), \text{bins} = [8,8,8])$$

where, bins is a number of groups divided from 256 gray levels, after calculating the color distribution for each superpixel, a matrix h(i) with size of m×8×8×8 (m is superpixel numbers);
   From the h(i) matrix, calculate a color correlation matrix between the superpixels, using the Bhattacharyya Coefficient (BC) as follows:

$$\operatorname*{color}_{i,j\in[1,m]}(i,j) = BC(h_i, h_j)$$

with BC being the Bhattacharyya Coefficient of two vectors:

$$BC(p,q) = -\ln(10^{-1} + \Sigma\sqrt{p_i q_i})$$

Proceed to merge neighboring superpixels with a similar color distribution wherein the superpixels with adjacent positions are superpixels that are directly linked to each other on the image, consequently, on the color correlation matrix, position (i,i+1) with BC lower than a predefined threshold, epsilon, then the two superpixels i and i+1 can be merged into a new superpixel;

After merging superpixels, the superpixels are updated, into new superpixels, as follows:

$$S_{updated}(i) \leftarrow S(i)$$
$$\scriptstyle i\in[1,n'] \quad i\in[1,n]$$

Continue to perform two previous steps, until the number of superpixels remains constant, then terminate the superpixel merging process, and obtain the final superpixel {S(i)i1,2, . . . , n};

Step 3: Statistics on the color and spatial characteristics of the superpixels; based on the superpixels {S(i)i=1,2, . . . , n} that are merged after Step 2, determine descriptive statistics about a scale of the superpixel, a distance to the center of the image, initialization and calculate the correlation of color distribution, spatial distribution, and the contrast of superpixels via the following sub-steps:

Determine Statistics of the distance from the center of the superpixel to the center of the image and count the number of pixels in the superpixel, wherein the superpixels that are close to the center of the image will likely be the salient area;

The distance from the superpixel to the center point of the image is defined by the Euclidean distance from the center of the superpixel to the center point of the original image, calculated as follows:

$$d(i) = \left\| \frac{\sum_{S(i)}(x,y)}{\sum_{S(i)}|(x,y)|}, (cx, cy) \right\|$$

Where (cx, cy) is a center point of the original image, which is half a height and width of the image, respectively, and is the total number of pixels in the superpixel S(i);

Calculate the color correlation matrix color (i,j), as in step 2;

From the set of superpixels S(i), calculate a circumscribed circle filling index of each superpixel, through the following sub-steps:

call the center point of the i-th superpixel as ci, then the radius of the circumcircle of this superpixel is calculated as follows:

$$r(i) = \max_{(x,y)\in S(i)}(\|(x,y), c_i\|)$$

The circumcircle filling index compact(i) of the superpixel is calculated by following equation:

$$\operatorname{compact}(i) = \frac{\sum_{(x,y)\in S(i)} |(x,y)|}{\pi \times r^2(i)}$$

From set of superpixels S(i) computed at step 2 and the circumcircle filling index compact(i) computed at step 3, calculate a spatial correlation matrix between superpixels, according to the following formula:

$$\operatorname{spatial}(i,j) = \left(1 - \frac{\|ci,cj\|}{\sqrt{cx^2+cy^2}}\right) \times (1 - \operatorname{compact}(i))$$

where ci, cj are center points of superpixels i, and j, respectively;

Compute a global contrast matrix between superpixels, where, superpixels with higher number of pixels have more effects on processing of evaluating saliency of the superpixels;

$$\operatorname{contrast}(i,j) = \operatorname*{dot}_{i,j\in[1,n]}\left(|\operatorname{color}(i,j)|, \left\{npixel_i = \sum_{S(i)}|(x,y)|\right\}\right)$$

Where $npixel_i$ is the number of pixels in superpixel i, also contrast(i,j) is normalized to [0,1] based on an interval [min(contrast), max(contrast)], where, dot (·) describes the multiplication of two matrices;

Step 4: analyze a final estimation of a discriminant between superpixels; this step calculates a composite correlation matrix, and a saliency evaluation vector of the superpixel, and interpolates the saliency index of each pixel in the corresponding superpixel according to the sub-steps as follows:

Synthesize the composite correlation matrix, similar(i, j), is a combination of factors:

color correlation matrix, spatial correlation matrix, as follows:

similar(i,j)=color(i,j)×spatial(i,j)

The composite correlation matrix is considered a correlation matrix with the estimations being the color correlation matrix under the effect of the spatial correlation matrix as a coefficient matrix, larger superpixels (a large number of pixels) will have more effect;

the saliency evaluation vector of the superpixel, decision (i) is calculated from the pixel correlation matrix from step 4, the global contrast matrix from step 3, and the statistical results of the distance from the center of the superpixel to the center point of the original image from step 3 with sub-steps as follows:

Calculate an extended spatial matrix spread(i,j), using the composite correlation matrix similar(i,j) and distance d(i) as follows:

$$\operatorname{spread}(i,j) = \frac{\operatorname{dot}(d(i), \operatorname{similar}(i,j))}{\sum_{axis=0} \operatorname{similar}(i,j)}$$

Then matrix spread(i,j) is normalized to [0, 1] based on interval [min(spread), max(spread)];

This step compensates the convergence factor into the initial center point of superpixels, the closer superpixel is to the center the more it gets attention, and it is highly potential is a part of salient objects;

the saliency evaluation vector, decision(i) is a sequence of evaluation indices, calculated as follows:

$$decision(i) = 1 - \frac{dot(contrast(i,j), similar(i,j)) \times dot(spread(i,j), similar(i,j))}{\sum_{axis=0} similar(i,j)^2}$$

The decision(i) vector has a length that is equal to number of initialized superpixels, the larger values are the more salient they are;

Calculate saliency index of each pixel p(x,y) in HSV space via salient evaluation vector, $$S(p) = \frac{\sum_{S(i) \in N(p)} decision(i) \times histogram(i)[bin(p)]}{\sum_{S(i) \in N(p)} histogram(i)[bin(p)]}$$

Where N(p) is neighboring pixels of p(x,y) (eight points),

In the above equation, pixels with more popular color intensity m superpixel, the saliency index of those pixels are higher, where bin(p) is color intensity (h,s,v) in HSV space of the pixel p(x, y) after it is compressed into 3-bits, as follows:

$$bin(p) = \left[ round\left(\frac{h}{8}\right), round\left(\frac{s}{8}\right), round\left(\frac{v}{8}\right) \right].$$

\* \* \* \* \*